United States Patent
Mehta et al.

(10) Patent No.: US 10,523,405 B2
(45) Date of Patent: Dec. 31, 2019

(54) 64 GIGABIT FIBRE CHANNEL SPEED NEGOTIATION AND TRANSMITTER TRAINING

(71) Applicant: AVAGO TECHNOLOGIES INTERNATIONAL SALES PTE. LIMITED, Singapore (SG)

(72) Inventors: Anil Mehta, Milpitas, CA (US); Scott Kipp, Santa Barbara, CA (US); Jeffrey A. Slavick, Ooltewah, TN (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 138 days.

(21) Appl. No.: 15/659,791

(22) Filed: Jul. 26, 2017

(65) Prior Publication Data
US 2018/0034660 A1     Feb. 1, 2018

Related U.S. Application Data

(60) Provisional application No. 62/369,306, filed on Aug. 1, 2016, provisional application No. 62/402,214, filed
(Continued)

(51) Int. Cl.
*H04L 5/14*     (2006.01)
*H04L 12/40*     (2006.01)
(Continued)

(52) U.S. Cl.
CPC ........ *H04L 5/1438* (2013.01); *H04L 12/4013* (2013.01); *H04L 41/0681* (2013.01);
(Continued)

(58) Field of Classification Search
CPC .............. H04L 5/1438; H04L 41/0896; H04L 29/06537; H04L 49/3054; H04L 49/357; H03K 7/02; H03M 13/05
See application file for complete search history.

(56) References Cited

U.S. PATENT DOCUMENTS

| 8,861,578 | B1 | 10/2014 | Lusted et al. |
| 2002/0034197 | A1* | 3/2002 | Tornetta ................. H04J 3/047 370/535 |

(Continued)

OTHER PUBLICATIONS

"SFF Specification for Diagnostic Monitoring Interface for Optical Transceivers" SFF Committee (Year: 2010).*
(Continued)

*Primary Examiner* — Omer S Mian
(74) *Attorney, Agent, or Firm* — Xsensus LLP

(57) ABSTRACT

Link speed negotiation for 64 Gbps is done at 32 Gbps to allow only two speeds to be used during link state negotiation. The desire for 64 Gbps operation is indicated in a field shared during link state negotiation. After link speed negotiation is completed at 32 Gbps, a determination is made whether 32 or 64 Gbps operation is desired. If 32 Gbps operation is desired, procedures continue as in the prior operations. If 64 Gbps operation is desired, a new procedure is performed. The new procedure provides time for the optical transceiver to changeover from the PAM2 (pulse amplitude modulation) or binary operation used in 32 Gbps operation to the PAM4 multi-level operation used in 64 Gbps operation. After determining that the optical transceiver is ready to transmit, transmitter training is performed, with increased handshaking to provide improved granularity. After transmitter training is complete, conventional link initialization is performed.

15 Claims, 10 Drawing Sheets

Related U.S. Application Data on Sep. 30, 2016, provisional application No. 62/427,383, filed on Nov. 29, 2016, provisional application No. 62/443,125, filed on Jan. 6, 2017, provisional application No. 62/453,720, filed on Feb. 2, 2017.

(51) Int. Cl.
*H04L 12/24* (2006.01)
*H04L 12/935* (2013.01)
*H04L 12/931* (2013.01)

(52) U.S. Cl.
CPC .......... *H04L 41/0896* (2013.01); *H04L 49/30* (2013.01); *H04L 49/352* (2013.01); *H04L 49/357* (2013.01)

(56) References Cited

U.S. PATENT DOCUMENTS

| | | |
|---|---|---|
| 2004/0013183 A1 | 1/2004 | Bremer |
| 2004/0022306 A1 | 2/2004 | Baumgartner |
| 2006/0164270 A1* | 7/2006 | Miller ............... H04L 25/03038 341/143 |
| 2007/0127920 A1 | 6/2007 | Ghiasi et al. |
| 2011/0191657 A1* | 8/2011 | Bliss ..................... H03M 13/05 714/784 |
| 2015/0098343 A1* | 4/2015 | Mehta ................. H04L 41/0896 370/244 |

OTHER PUBLICATIONS

PCT Int'l Search Report & Written Opinion filed in copending PCT Application No. PCT/US2017/043852 dated Sep. 26, 2017, 9 pages.

\* cited by examiner

Control Field

| Bits | Field Name | Content |
|---|---|---|
| 15-14 | Extended Marker | Set to 11b: Extended Marker for 32GFC<br>Set to 10b: Extended Marker for 64GFC<br>Set to 01b: reserved<br>Set to 00b: reserved |
| 13 | Preset | Set to one: the transmitter should set all coefficients to preset values.<br>Set to zero: no transmitter action advised. |
| 12 | Initialize | Set to one: the transmitter should set all coefficients to initialize values.<br>Set to zero: no transmitter action advised. |
| 11 | FECReq | Set to one: the FC_Port is requesting use of Forward Error Correction (FEC) (See 5.3) in association with 64B/66B.<br>Set to zero: the FC_Port is directing not to use Forward Error Correction (FEC) in association with 64B/66B. |
| 10 | Parallel lane support | Set to one: parallel lanes are supported.<br>Set to zero: single lane is supported. |
| 9-8 | Modulation and Precoding request | 9  8<br>1  1   PAM4 with precoding<br>1  0   PAM4<br>0  1   Reserved<br>0  0   PAM2 |
| 7-5 | Reserved | Transmit as 0, Ignore on receipt |
| 4-2 | Coefficient Select | 4 3 2<br>1 1 0   c(-2)<br>1 1 1   c(-1)<br>0 0 0   c(0)<br>0 0 1   c(1) |
| 1-0 | Coefficient Request | 1 0<br>1 1 No Equalization<br>1 0 Decrement<br>0 1 Increment<br>0 0 Hold |

*Fig. 11*

Status Field

| Bits | Field Name | Content |
|---|---|---|
| 15 | TC | 1=Training is complete and receiver is ready for data<br>0 = Request for Training to continue |
| 14 | SN | 1 = Transmitter has not completed LSN<br>0 = Transmitter has completed LSN |
| 13 | Reserved | Transmit as 0, Ignore on receipt |
| 12 | TF | 1 = Transmitter is operating with Fixed Coefficients<br>0 = Transmitter coefficients may be trained by the receiver |
| 11:10 | Modulation and Precoding Status | 11 10<br>1  1   PAM4 with precoding<br>1  0   PAM4<br>0  1   Reserved<br>0  0   PAM2 |
| 9 | Receiver Frame Lock | 1 = Frame Boundaries Identified<br>0 = Frame Boundaries not identified |
| 8 | Initial Condition Status | 1 = Updated<br>0 = Not Updated |
| 7 | Parity | Parity bit to provide DC Balance |
| 6 | Reserved | Transmit as 0, Ignore on Receipt |
| 5:3 | Coefficient Select Echo | 5 4 3<br>1 1 0   $c(-2)$<br>1 1 1   $c(-1)$<br>0 0 0   $c(0)$<br>0 0 1   $c(1)$ |
| 2:0 | Coefficient Status | 2 1 0<br>1 1 1 Reserved<br>1 1 0 Coefficient at Limit and maximum voltage<br>1 0 1 Reserved<br>1 0 0 Maximum Voltage<br>0 1 1 Coefficient Not Supported<br>0 1 0 Coefficient at Limit<br>0 0 1 Updated<br>0 0 0 Not Updated |

*Fig. 12*

64 GIGABIT FIBRE CHANNEL SPEED NEGOTIATION AND TRANSMITTER TRAINING

CROSS REFERENCE TO RELATED APPLICATIONS

This application claims the benefit under 35 U.S.C. § 119(e) of U.S. Provisional Patent Application Ser. No. 62/369,306 entitled "64/256GFC Link Speed Negotiation and Transmitter Training for FC-PI-7," filed Aug. 1, 2016; 62/402,214 entitled "Link Speed Negotiation and Transmitter Training for FC-PI-7," filed Sep. 30, 2016; 62/427,383 entitled "Link Speed Negotiation and Transmitter Training for FC-PI-7," filed Nov. 29, 2016; 62/443,125 entitled "Link Speed Negotiation and Transmitter Training for FC-PI-7," filed Jan. 6, 2017; and 62/453,720 entitled "Link Speed Negotiation and Transmitter Training for FC-PI-7," filed Feb. 2, 2107, which are all hereby incorporated by reference.

This application is related to U.S. patent application Ser. No. 14/308,143 entitled "128 Gigabit Fibre Channel Physical Architecture," filed Jun. 18, 2014, now U.S. Pat. No. 9,461,941; U.S. patent application Ser. No. 15/253,666 entitled "128 Gigabit Fibre Channel Physical Architecture," filed Aug. 31, 2016; U.S. patent application Ser. No. 14/501,803 entitled "128 Gigabit Fibre Channel Speed Negotiation," filed Sep. 30, 2014, now U.S. Pat. No. 9,467,304; and U.S. patent application Ser. No. 15/261,557 entitled "128 Gigabit Fibre Channel Speed Negotiation," filed Sep. 9, 2016, all of which are hereby incorporated by reference.

BACKGROUND OF THE INVENTION

1. Field of the Invention

The invention relates to the physical layer of high speed networking.

2. Description of the Related Art

Speeds of network links are ever increasing. Today Ethernet speeds of 40 and 100 Gigabits per second (Gbps) are available, with 50/100/200 Gigabits per second (Gbps) in development. Fibre Channel (FC) speeds of 32 and 128 Gbps are available. To continue widespread use of Fibre Channel, the next speed generation, 64 and 256 Gbps, must be developed. Therefore it is desirable to advance Fibre Channel to the next speed generation but still provide flexibility in operation.

Per industry convention, FC optical transceivers are to operate at three different speeds, such as 8/16/32 Gbps. A complicating factor is that the optical transceivers only include a single pin for speed indication, making the availability of three speeds more difficult. For 32 Gbps optical transceivers, the 1 or set value of the rate select pin indicated 32 Gbps operation and the 0 or cleared value indicated 8 or 16 Gbps operation. The intent was that the optical transceiver was to monitor the received signals during training and determine whether 8 or 16 Gbps operation was to be performed. In practice this determination proved challenging and a series of complicated workarounds were needed to clearly determine 8 or 16 Gbps operation. It was understood that the workarounds would not operate at 64 Gbps, so a different method was needed to indicate 16, 32 or 64 Gbps operation for the optical transceiver.

SUMMARY OF THE INVENTION

According to the embodiments of the present invention the FC link state negotiation and transmitter training are enhanced to allow operation at 64 Gbps but maintain backward compatibility with 16 and 32 Gbps operation and provide reliable configuration and operation of the optical transceivers. Briefly, link speed negotiation for 64 Gbps is done at 32 Gbps to allow only two speeds to be used during link state negotiation. The desire for 64 Gbps operation is indicated in a field shared during link state negotiation. After link speed negotiation is completed at 32 Gbps, a determination is made whether 32 or 64 Gbps operation is desired. If 32 Gbps operation is desired, procedures continue as in the prior operations. If 64 Gbps operation is desired, a new procedure is performed. The new procedure provides time for the optical transceiver to changeover from the PAM2 (pulse amplitude modulation) or binary operation used in 32 Gbps operation to the PAM4 multi-level operation used in 64 Gbps operation. After determining that the optical transceiver is ready to transmit, transmitter training is performed, with increased handshaking to provide improved granularity. After transmitter training is complete, conventional link initialization is performed.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 11 is a table illustrating a transmitter training signal control field according to the present invention.

FIG. 12 is a table illustrating a transmitter training signal status field according to the present invention.

DETAILED DESCRIPTION

Figure 1:
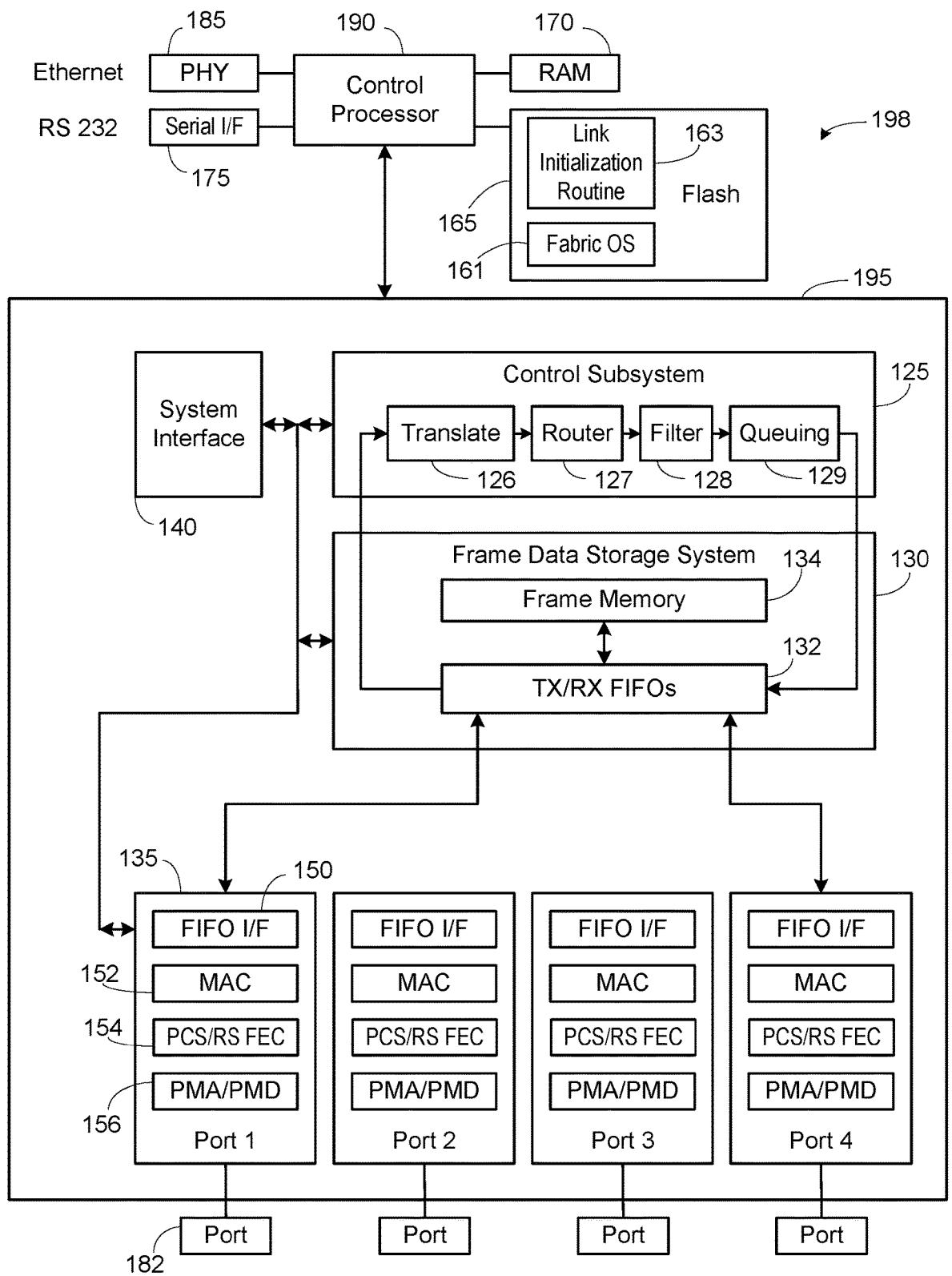
FIG. 1 is a block diagram of a Fibre Channel switch according to the present invention.

FIG. 1 is a block diagram of an exemplary 64 or 256 Gbps Fibre Channel (FC) switch 198 according to the present invention. A control processor 190 is connected to a switch ASIC 195. The switch ASIC 195 is connected to ports 182. Generally the control processor 190 configures the switch ASIC 195 and handles higher level switch operations, such as the name server, routing table setup, and the like. The switch ASIC 195 handles general high speed inline or in-band operations, such as switching, routing and frame translation. The control processor 190 is connected to flash memory 165 or the like to hold the software and programs for the higher level switch operations such as fabric operating system 161 and link initialization routines 163; to random access memory (RAM) 170 for working memory, such as the name server and router tables; and to an Ethernet PHY 185 and serial interface 175 for out-of-band management.

The switch ASIC 195 has four basic modules: port modules 135, a frame data storage system 130, a control subsystem 125 and a system interface 140. The port modules 135 perform the lowest level of packet transmission and reception. Generally, frames are received from a port 182 and provided to the frame data storage system 130. Further, frames are received from the frame data storage system 130 and provided to the port 182. The frame data storage system 130 includes a set of transmit/receive FIFOs 132, which interface with the port modules 135, and a frame memory 134, which stores the received frames and frames to be transmitted. The frame data storage system 130 provides initial portions of each frame, typically the frame header and a payload header for FCP frames, to the control subsystem 125. The control subsystem 125 has the translate 126, router 127, filter 128 and queuing 129 blocks. The translate block 126 examines the frame header and performs any necessary address translations. There can be various embodiments of the translation block 126, with examples of translation operation provided in U.S. Pat. Nos. 7,752,361 and 7,120,728, both of which are incorporated herein by reference in their entirety. Those examples also provide examples of the control/data path splitting of operations. The router block 127 examines the frame header and selects the desired output port for the frame. The filter block 128 examines the frame header, and the payload header in some cases, to determine if the frame should be transmitted. The queuing block 129 schedules the frames for transmission based on various factors including quality of service, priority and the like.

Each port module 135 includes a series of submodules. A FIFO interface submodule 150 provides the interface to the FIFOs 132. A MAC submodule 152 is connected to the FIFO interface 150. A combined PCS/FEC submodule 154 according to the present invention is connected to the MAC submodule 152. A PMA/PMD optical transceiver submodule 156 is connected to the PCS/FEC submodule 154 and the respective port 182.

This is an exemplary architecture and numerous other architectures as well known to those skilled in the art exist.

Figure 2:
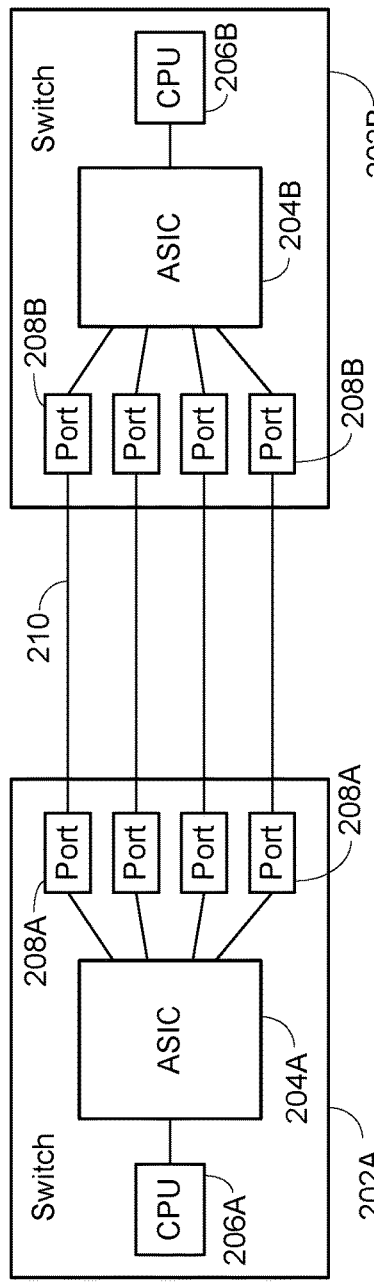
FIG. 2 is a block diagram of two connected Fibre Channel switches according to the present invention.

FIG. 2 is a block diagram of two connected Fibre Channel switches 202A, 202B, such as the switch 198. Each switch 202A, 202B has an ASIC 204A, 204B, a CPU 206A, 206B and ports 208A, 208B. The ports 208A, 208B are connected by optical cables 210.

Figure 3:
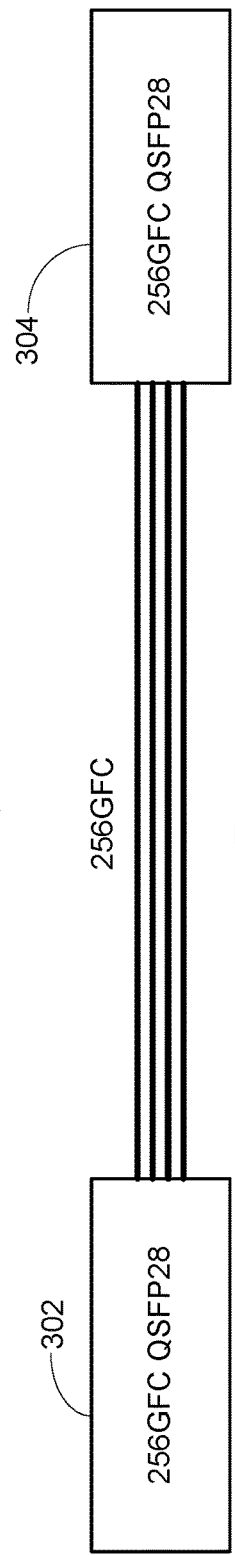
FIG. 3 is a block diagram of two interconnected optical transceivers according to the present invention.
Figure 4:
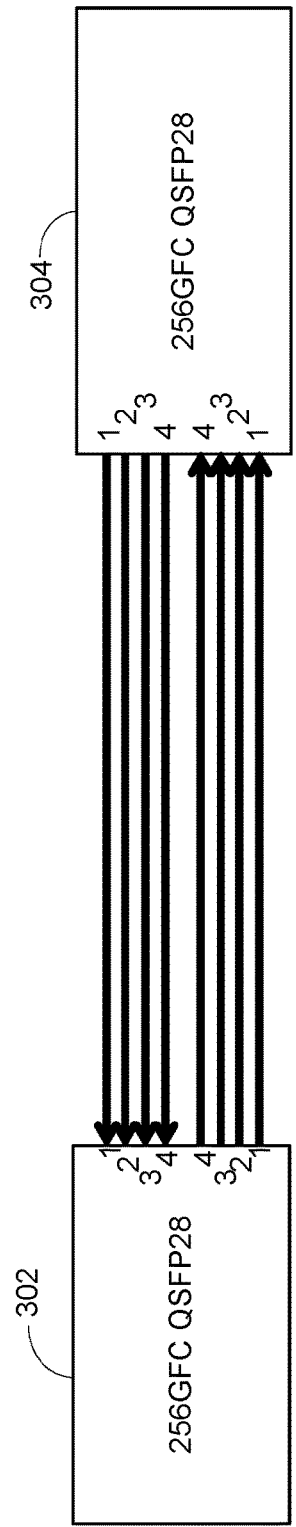
FIG. 4 is a more detailed version of the block diagram of FIG. 3.

FIG. 3 illustrates the simplest variation of connecting two switches, where two 256 Gbps QSFP 28 transceivers 302 and 304 are directly connected with four parallel lanes. FIG. 4 provides further details on the actual connections of the transceivers 302 and 304 of FIG. 3. According to the conventions of QSFP 28 transceivers, lanes 1-4 are defined as starting from the outer edge and going inward. Thus QSFP 28 transceiver 302 transmit lane 1 is connected to QSFP 28 transceiver 304 receive lane 1, QSFP 28 transceiver 302 transmit lane 2 is connected to QSFP 28 transceiver 304 receive lane 2, and so on. The embodiments of FIGS. 3 and 4 can operate at 64 Gbps individually or 256 Gbps if the ports are configured correctly.

Figure 5:
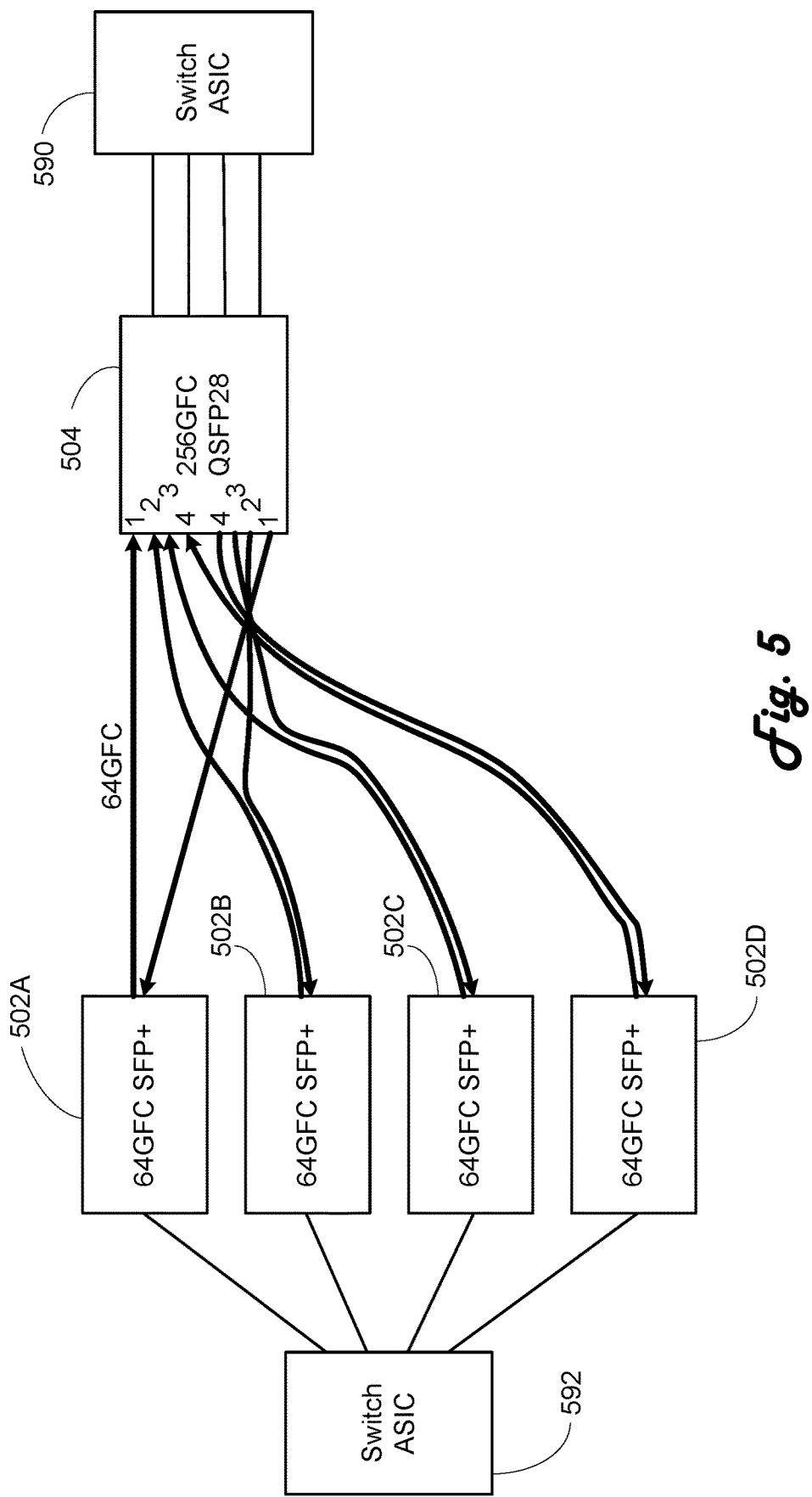
FIG. 5 is a block diagram of an alternate embodiment utilizing a quad transceiver in one Fibre Channel switch and four individual transceivers in a connected Fibre Channel switch according to the present invention.

The above discussion has focused on connecting two QSFP 28 transceivers to develop a 256 Gbps link. This is based in part that this most easily lends itself to developing the link as a quad link cable will be used so that link skews are minimized and that the four transceiver ports are most likely to be connected to four adjacent ports on the switch ASIC. However, this is not the only configuration that allows for development of a 256 Gbps link. Referring to FIG. 5, a QSFP 28 transceiver 504 is connected to four adjacent ports on a switch ASIC 590, such as the switch ASIC 195. This is as in the above configuration. Four 32 Gbps SFP+ transceivers 502A-502D are connected to the QSFP 28 transceiver 504, each SFP+ transceiver connected to one lane of the QSFP 28 transceiver 504. The four 64 Gbps SFP+ transceivers 502A-502D are then connected to adjacent ports on a switch ASIC 590, again similar to switch ASIC 195. It is noted that the adjacency need not necessarily be physical adjacency but rather logical adjacency if the switch ASIC is able to group physically separated ports into a logical group of four for lane operations as described in the related U.S. patent application Ser. No. 14/308,143 entitled "128 Gigabit Fibre Channel Physical Architecture" to be performed. Thus there can be internal routing from the physical or PMA/PMD port to the PCS/RS FEC module.

Figure 6:
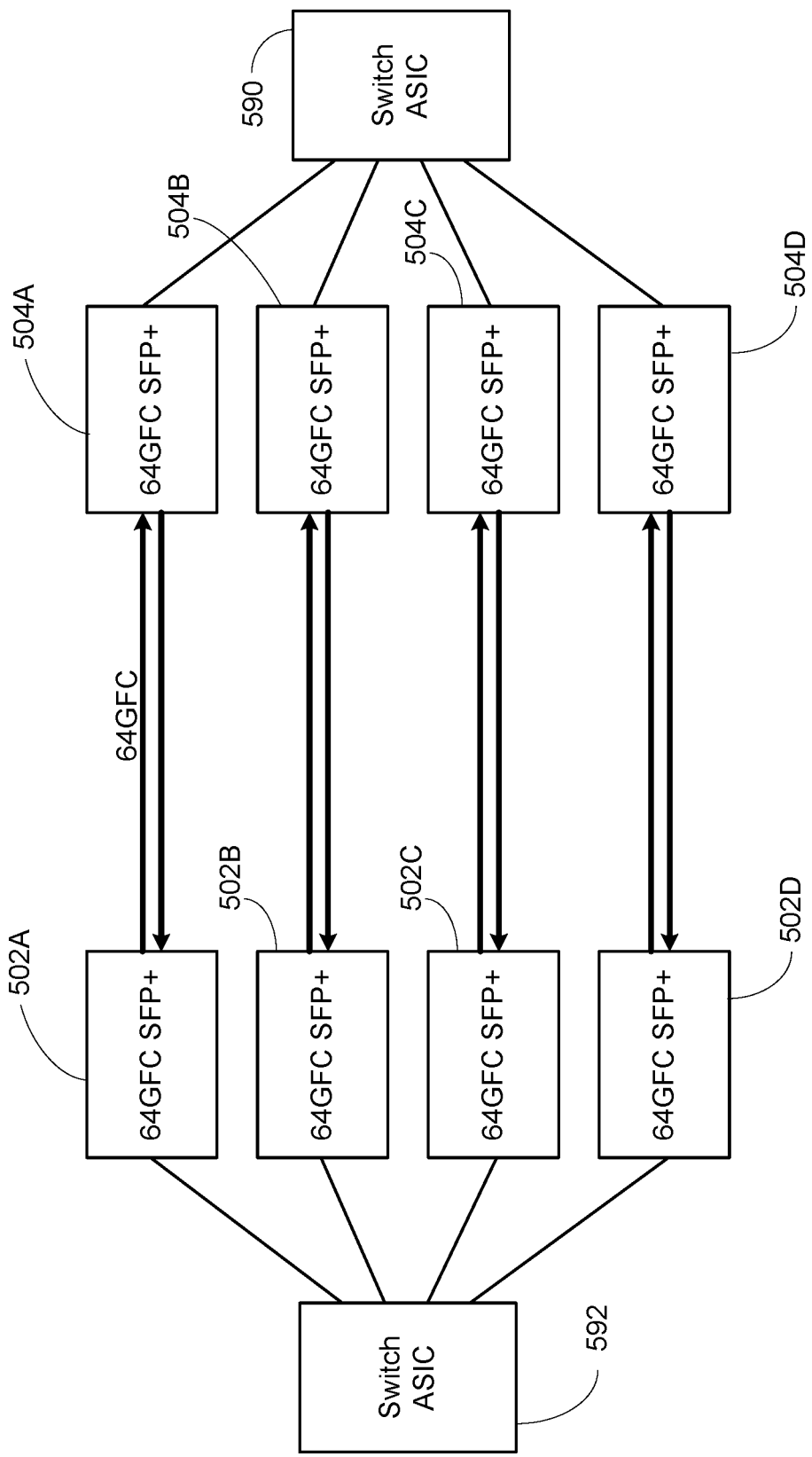
FIG. 6 is a block diagram of an alternate embodiment utilizing four individual transceivers in each Fibre Channel switch according to the present invention.

FIG. 6 is similar to FIG. 5 except the QSFP 28 504 has been replaced by four 64 Gbps SFP+ transceivers 504A-504D.

Figure 7:
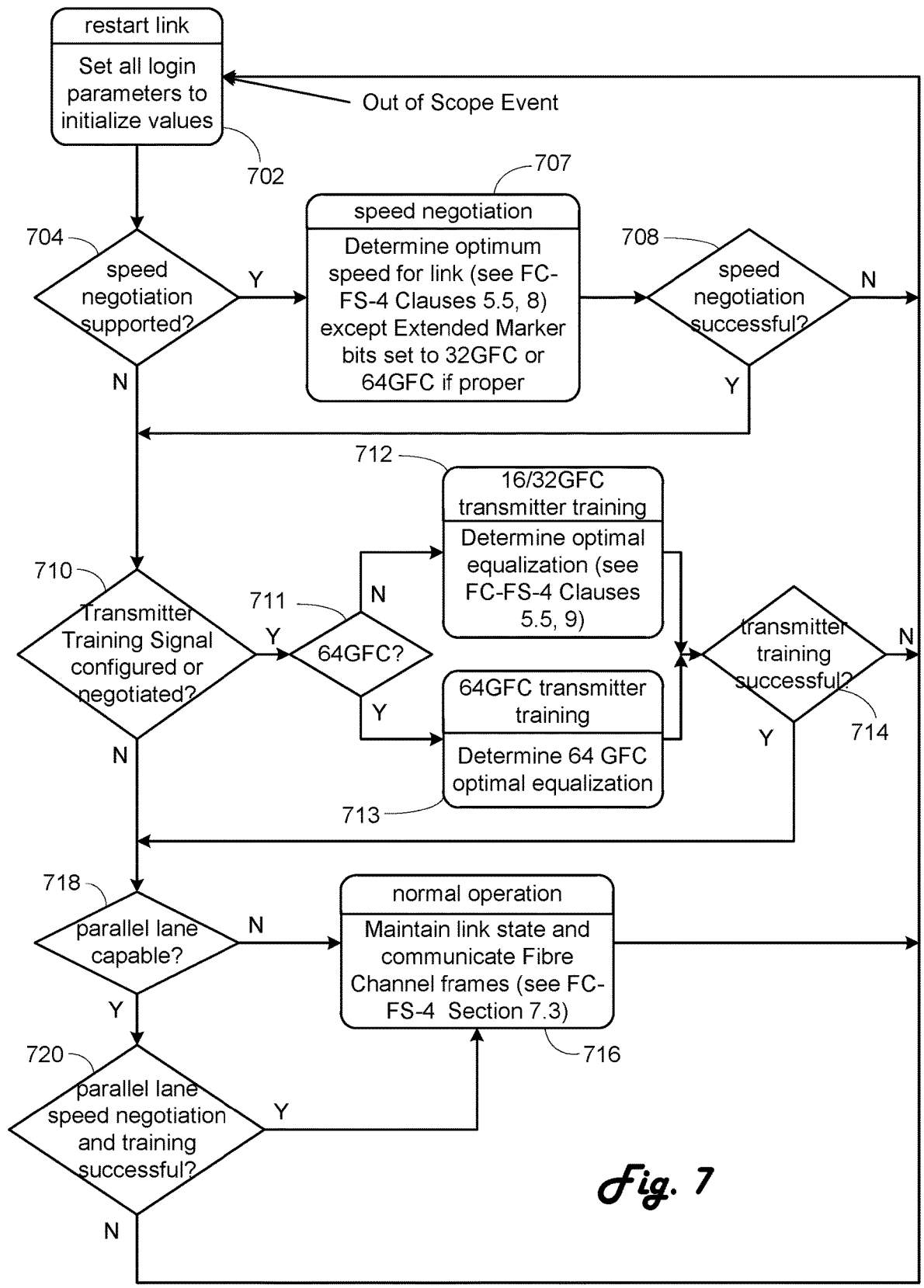
FIG. 7 is a port state machine according to the present invention.

The FC-FS-4 Rev. 1.40 specification dated Oct. 7, 2015, hereby incorporated by reference, defines a port state machine for starting or restarting a link in Section 7.2. The state machine of the FC-FS-4 specification modified according to U.S. Pat. No. 9,467,304 and according to the present invention is provided in FIG. 7. In step 702 all login parameters are set to initialize values. In step 704 it is determined if speed negotiation is supported for the port. If so, in step 707 the optimum speed for the link is determined. According to the present invention, 64 Gbps speed negotiation is generally performed as in the prior art, including FC-FS-4 and 32 Gbps operation, except that the Extended Marker bit value in the Control Field is set at 10*b* as shown in the table of FIG. 11 and used in the negotiation. Thus, 32 Gbps and 64 Gbps speed negotiation are done at 32 Gbps. This means that only two speeds are used during link speed negotiation, 16 Gbps and 32 Gbps. As there are only the two speeds, they can be directly selected using the existing rate select pin of the optical transceiver. The choice between 32 and 64 Gbps operation is based on the value of the Extended Marker bits on the Control Field.

Therefore, with the combination of using only two speeds for speed negotiation and indicating the selection of the third speed in the Extended Marker, the problems of speed selection for 32 Gbps optical transceivers is solved, allowing a positive and simple determination.

Figure 8:
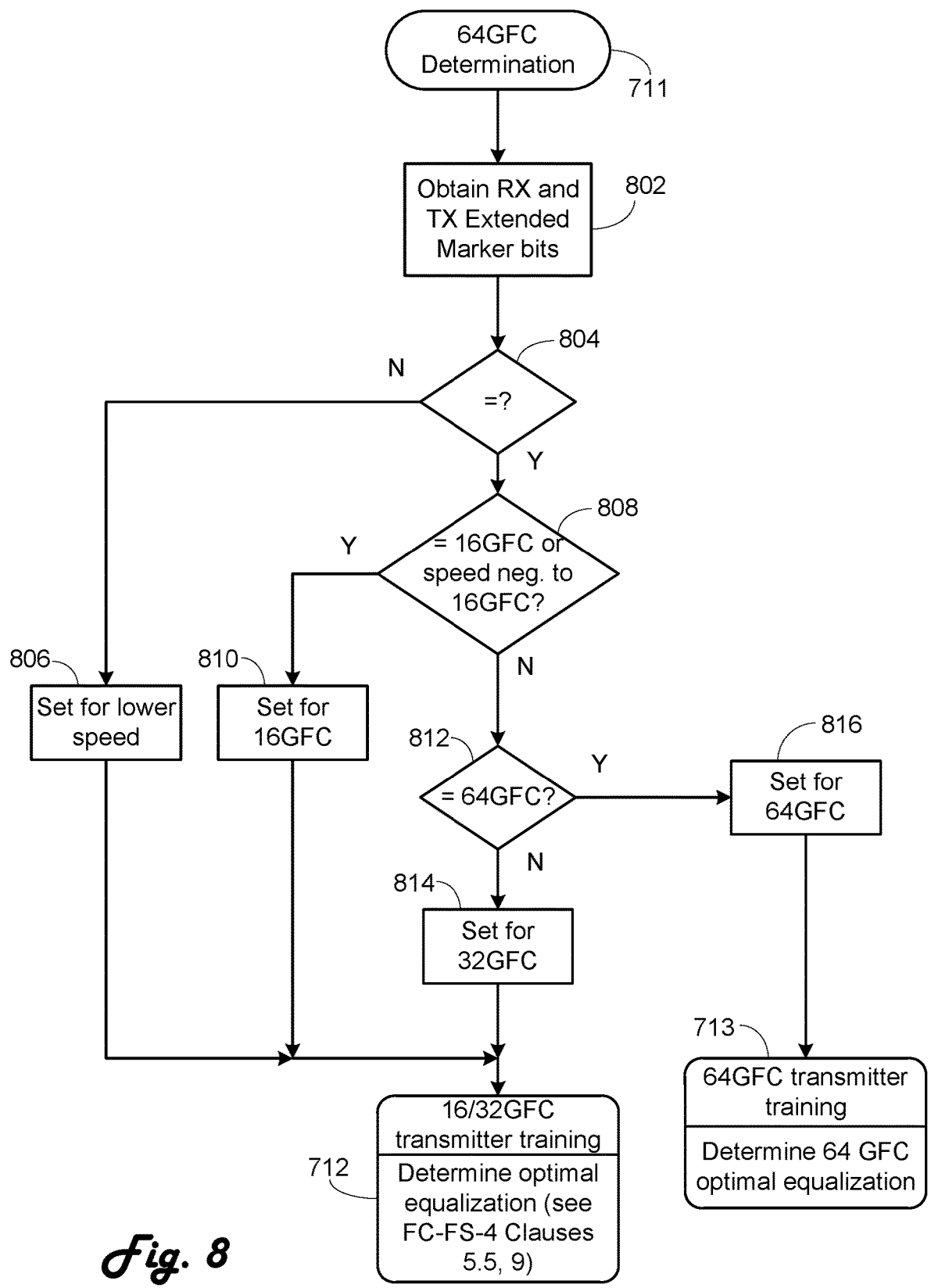
FIG. 8 is a state machine for determining 64 Gbps operation according to the present invention.

Step 708 determines if speed negotiation was successful. If not, then operation returns to step 702. If successful or if speed negotiation is not supported, next step 710 determines if transmitter training signal is configured or supported. If so, according to the present invention a determination is made in step 711 whether 64 Gbps operation is to be performed. This determination is indicated in detail in FIG. 8. In step 802, the receive and transmit Extended Marker bits are obtained. Step 804 determines if the transmit and receive values are equal. If not, operation proceeds to step 806 where operation is set at the lower of the two indicated values. Alternatively, this condition could be considered an error condition and link operation restarted. After setting the lower speed operation in step 806, control proceeds to 16/32

Gbps transmitter training 712, which is performed according to FC-FS-4 and the prior art. If the Extended Marker bits are equal, step 808 determines if the desired speed is 16 Gbps or the negotiated speed is 16 Gbps. If so, control proceeds to step 810 where 16 Gbps operation is set. If not 16 Gbps operation, step 812 determines if the desired speed is 64 Gbps. If not, operation proceeds to step 814 where 32 Gbps operation is set, and then to 16/32 Gbps transmitter training 712. If 64 Gbps is determined, operation proceeds to step 814 where 64 Gbps is set and then to 64 Gbps transmitter training 713.

If determined in step 711 to not be 64 Gbps, in step 712 16/32 Gbps transmitter training occurs to determine the optimal transmitter equalization. If 64 Gbps operation is set, in step 713 64 Gbps transmitter training occurs to determine the optimal transmitter equalization. This 64 Gbps transmitter training is illustrated in FIG. 9

Figure 9:
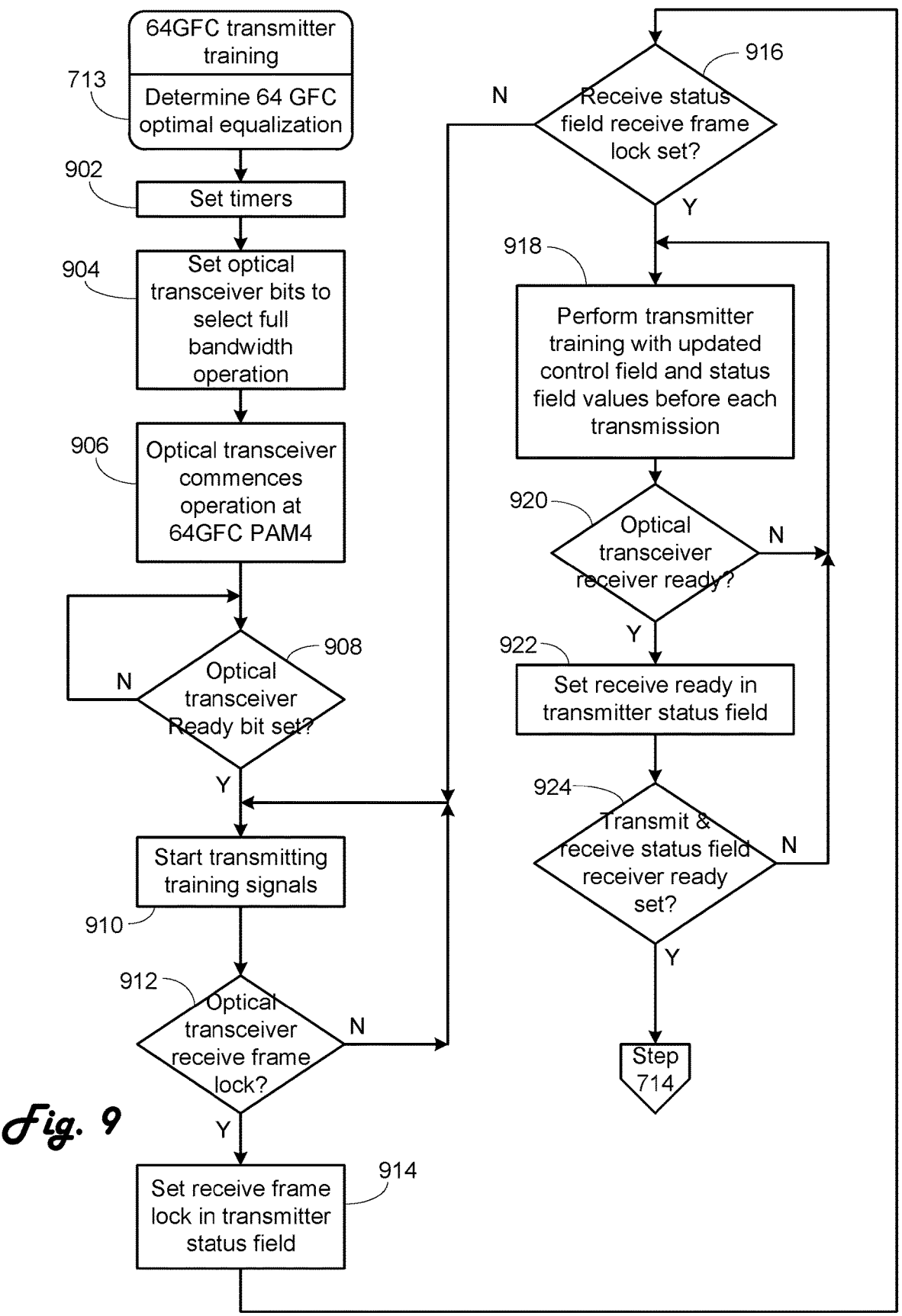
FIG. 9 is a state machine for 64 Gbps transmitter training according to the present invention.

Referring to FIG. 9, in step 902 various timers are set in case operations stall. In step 904 the optical transceiver bits to select full bandwidth operation is set. According to the SFF-8742 standard, the bits are at address A2*h*, byte 110, bit 3, Soft Rate_Select Select (RS(0)) and A2*h*, byte 118, bit 3. Soft RS(1) Select. In step 906 the optical transceiver commences 64 Gbps PAM4 operation. As the optical transceiver will have been in 32 Gbps NRZ or PAM2 mode, it will take some time to become operational at 64 Gbps PAM4. In step a new Ready bit in the optical transceiver is monitored. This is a new bit in the optical transceiver and is preferably in a formerly reserved area, such as address A2*h*, byte 119, bits 7-2, for example, though other bits could be used. When the optical transceiver is ready to commence operation at 64 Gbps PAM4, the Ready bit is set and operation proceeds to step 910.

In step 910 the optical transceiver begins transmitting the transmitter training signals as described in FC-FS-4, Section 5.5 except that various values in the Control Field and Status Field are changed to reflect the needs of PAM4 operation and to provide more handshake checkpoints. FIG. 11 is the preferred Control Field according to the present invention and FIG. 12 is the preferred Status Field according to the present invention. Reviewing the Control Field, as noted above, an additional state has been added to the Extended Marker to indicate 64 Gbps operation. Bits 9 and 8 have used to indicate desired encoding, though it is understood that 64 Gbps uses PAM4. Bits 5-0 relating to coefficients have been reconfigured to better conform to the needs of the 64 Gbps optical transceiver. Reviewing the Status Field, bit 13 preferably is a reserved bit as FEC operation is mandatory. Reserved bits 11-7 are preferably used as shown. Bits 11 and 10 indicate the modulation state of the optical transceiver. Bit 9 indicates that the receiver has achieved frame lock, to improve handshaking. Bit 8 becomes Initial Condition Status and bit 7 becomes a parity bit. Bits 5-0 are reconfigured similar to bits 5-0 in the Control Field.

After commencing transmitting, in step 912 it is determined if the optical transceiver has obtained receive frame lock. Receive frame lock is a function of the ASIC, as the ASIC contains the relevant PMD portions that scan the incoming data stream from the optical interface for the frame marker. Transmission continues until receive frame lock is developed or a timer expires. When receive frame lock is determined, in step 914 the Receive Frame Lock bit is set in the Status Field so that the state can be indicated to the far end. In step 916 a determination is made if the far end is indicating that it has Receive Frame Lock by reading the bit in the received Status Field. If not, transmission continues in step 910. When the far end indicates Receive Frame Lock and the optical transceiver has indicated Receive Frame Lock, full training with changing of coefficient values begins in step 918.

After training commences, in step 920 a determination is made if the receiver in the optical transceiver is ready based on an ASIC determination of eye diagrams and the receive tuning circuit states that is known to one skilled in the art. If note, training continues in step 918. If the receiver is ready, in step 922 the Receive Ready bit in the Status Field is set to inform the far end. In step 924 a determination is made is Receive Ready is set at both ends. If not, transmitter training continues in step 918. If both ends indicate Receive Ready, Operation proceeds to step 714.

Step 714, which is after 16/32 Gbps transmitter training 712 and 64 Gbps transmitter training 713, determines if the transmitter training was successful. If not, step 702 is the next step. If successful or if the transmitter training signal is not configured or negotiated, operation proceeds to step 718. Step 718 determines if the port is parallel lane capable. This information is obtained from bit to of the training frame Control Field, as shown in FIG. 11.

Figure 10:
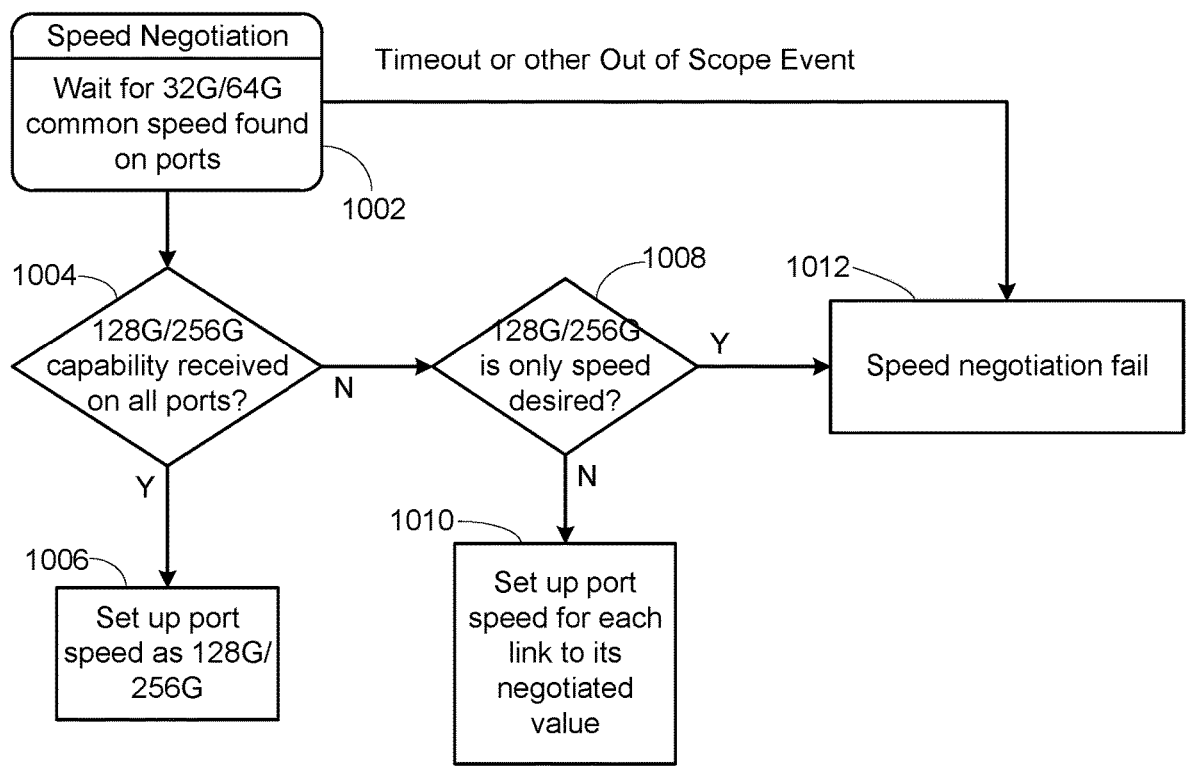
FIG. 10 is a state machine for determining multi-link operation according to the present invention.

Understanding that the above link speed negotiation and transmitter training has been done independently for each port or link, parallel lane operation then determines is these independent links can then be combined to form a higher speed unified ink. If the ports are not parallel capable, then normal operation in step 716 is performed, with each port operating at the negotiated speed. If the port is parallel lane capable, in step 720 a determination is made whether parallel lane speed negotiation and training were successful. This operation is detailed in FIG. 10 described below. If successful, operation proceeds to step 716 for normal operation. The speed for the port is provided as shown in FIG. 10. If not successful in step 720, operation returns to step 702.

FIG. 10 sets up 128/256 Gbps operation and is the operative portion of step 720. It commences with step 1002 by waiting for completion of speed negotiation and training on all four ports. When complete, in step 1004 a determination is made whether all four ports have indicated 128 or 256 Gbps capability. This means that the port has indicated it is a 32 or 64 Gbps port, has parallel lane capability, the port is set to either 128 or 256 Gbps operation or 128 or 256 Gbps or individual lane operation and the individual link speed negotiations and training have completed successfully. If all are true, in step 1006 the port speed is set as 128 or 256 Gbps and striping as described in the related U.S. patent application Ser. No. 14/308,143 entitled "128 Gigabit Fibre Channel Physical Architecture" can occur.

If 128 or 256 Gbps capability was not indicated on all four ports, i.e. at least one of the ports did not report true to each of the points above, then a determination is made in step 1008 whether the ports are set for 128 or 256 Gbps only operation. If not, then the port speed for each link is set to the value negotiated for the link in step 1010. Thus the four ports may all be operable but not at 32 or 64 Gbps or are not connected correctly. If in step 1008 128 or 256 Gbps is the only speed desired for the ports, then in step 1012 speed negotiation is indicated as a failure when operation proceeds in step 720.

The various operations and determinations are done with combinations of the optical transceiver, logic in the switch ASIC and programs executing on the CPU. For example, frame lock is determined by setting the switch ASIC for the desired speed and determining if hardware inside the switch ASIC is able to lock onto the received signal to develop frame lock. As another example, the values contained in the Control Field and the Status Field are provided by the CPU based on the link initialization programs, the values being written into registers in the ASIC, with the ASIC providing the transmitter training set to the optical transceiver. In general, the control is provided by the programs on the CPU, with the switch ASIC and optical transceiver performing the necessary hardware operations. This relationship is generally as in the prior art and well known to those skilled in the art.

The problems of setting link speed and training for 64 Gbps Fibre Channel operation are addressed by performing link speed negotiation at 32 Gbps and indicating 64 Gbps in a Control Field value, thus overcoming the problems that occurred in 32 Gbps Fibre Channel. As 32 Gbps is done using PAM2 and 64 Gbps uses PAM4, a status bit is added to the optical transceiver and a startup delay is provided before transmitter training to allow PAM4 operation to compensate for the link speed negotiation at 32 Gbps. With these changes, problems developed in the 32 Gbps are resolved and operation at 64 Gbps is simplified.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method, performed by a processor, comprising the steps of:
    performing link speed negotiation for a port at one end of a Fibre Channel link using an optical transceiver capable of operating at three different speeds but having only one speed selection pin by performing link speed negotiation at only two of the three different speeds and selecting the third speed of the three different speeds by reviewing a bit setting in a Control Field in a Training Frame in a Transmitting Training Signal;
    determining if the negotiated speed requires a change from the modulation type used during link speed negotiation;
    proceeding directly to transmitter training when no change in modulation type is determined and performing transmitter training;
    setting the changed modulation type in the optical transceiver when a change in modulation type is determined;
    determining that the optical transceiver is ready to operate using the changed modulation type by monitoring a Ready bit in an addressable memory location of a memory in the optical transceiver, wherein the optical transceiver operates according to a small form factor (SFF) specification;
    proceeding to changed modulation type transmitter training when it is determined that the optical transceiver is ready to operate using the changed modulation type; and
    performing changed modulation type transmitter training.

2. The method of claim 1, wherein the two speeds used for link speed negotiation are the lowest speed and the middle speed and wherein the bit setting indicates the highest speed.

3. The method of claim 2, wherein the three speeds are 16 Gigabits per second (Gbps), 32 Gbps and 64 Gbps.

4. The method of claim 1, wherein performing changed modulation type transmitter training includes:
    determining if the optical transceiver has achieved frame lock;
    setting a receiver frame lock bit in a Status Field in the Training Frame in the Transmitting Training Signal when it is determined that the optical transceiver has achieved frame lock;
    determining that far end receive frame lock has been achieved by monitoring received bits in the Status Field in the Training Frame in the Transmitting Training Signals; and
    commencing coefficient training when it is determined that the optical transceiver has achieved frame lock and that the far end frame lock has been achieved.

5. The method of claim 1, further comprising the steps of:
    independently performing the steps of claim 1 for ports at one end of three additional Fibre Channel links which are parallel with the Fibre Channel link;
    determining, after speed negotiation and transmitter training, if the ports at one end of each of the four parallel connected Fibre Channel links are capable of operating as parallel lanes;
    determining, after speed negotiation and transmitter training, if each of the ports at one end of the four parallel connected Fibre Channel links has indicated capability of operation at four times the rate of an individual link;
    determining, after speed negotiation and transmitter training, if each of the four parallel connected Fibre Channel links has independently negotiated for operation at an equal speed which allows four parallel connected Fibre Channel links to be combined for operation at four times the rate of an individual link; and
    determining, after speed negotiation and transmitter training, if each of the four parallel connected Fibre Channel links has independently negotiated for operation at an equal speed which allows four parallel connected Fibre Channel links to be combined for operation at four times the rate of an individual link; and
    configuring each of the ports at one end of the four parallel connected Fibre Channel links for operation at four times the rate of an individual link upon determining that the ports at one end of each of the four parallel connected Fibre Channel links are capable of operating as parallel lanes, that each of the ports at one end of each of the four parallel connected Fibre Channel links has indicated capability of operation at four times the rate of an individual link and that each of the four parallel connected Fibre Channel links has independently negotiated for operation at an equal speed which allows four parallel connected Fibre Channel links to be combined for operation at four times the rate of an individual link.

6. One or more non-transitory processor-readable storage media encoding computer executable instructions for executing a method on a computer system, the method comprising the steps of:
    performing link speed negotiation for a port at one end of a Fibre Channel link using an optical transceiver capable of operating at three different speeds but having only one speed selection pin by performing link speed negotiation at only two of the three different speeds and selecting the third speed of the three different speeds by reviewing a bit setting in a Control Field in a Training Frame in a Transmitting Training Signal;
    determining if the negotiated speed requires a change from the modulation type used during link speed negotiation;

proceeding directly to transmitter training when no change in modulation type is determined and performing transmitter training;

setting the changed modulation type in the optical transceiver when a change in modulation type is determined;

determining that the optical transceiver is ready to operate using the changed modulation type by monitoring a Ready bit in an addressable memory location of a memory in the optical transceiver, wherein the optical transceiver operates according to a small form factor (SFF) specification;

proceeding to changed modulation type transmitter training when it is determined that the optical transceiver is ready to operate using the changed modulation type; and performing changed modulation type transmitter training.

7. The one or more non-transitory processor-readable storage media of claim 6, wherein the two speeds used for link speed negotiation are the lowest speed and the middle speed and wherein the bit setting indicates the highest speed.

8. The one or more non-transitory processor-readable storage media of claim 7, wherein the three speeds are 16 Gigabits per second (Gbps), 32 Gbps and 64 Gbps.

9. The one or more non-transitory processor-readable storage media of claim 6, wherein performing changed modulation type transmitter training includes:

determining if the optical transceiver has achieved frame lock;

setting a receiver frame lock bit in a Status Field in the Training Frame in the Transmitting Training Signal when it is determined that the optical transceiver has achieved frame lock;

determining that far end receive frame lock has been achieved by monitoring received bits in the Status Field in the Training Frame in the Transmitting Training Signals; and commencing coefficient training when it is determined that the optical transceiver has achieved frame lock and that the far end frame lock has been achieved.

10. The one or more non-transitory processor-readable storage media of claim 6, wherein the method further comprises the steps of:

independently performing the steps of claim 6 for ports at one end of three additional Fibre Channel links which are parallel with the Fibre Channel link;

determining, after speed negotiation and transmitter training, if the ports at one end of each of the four parallel connected Fibre Channel links are capable of operating as parallel lanes;

determining, after speed negotiation and transmitter training, if each of the ports at one end of the four parallel connected Fibre Channel links has indicated capability of operation at four times the rate of an individual link;

determining, after speed negotiation and transmitter training, if each of the four parallel connected Fibre Channel links has independently negotiated for operation at an equal speed which allows four parallel connected Fibre Channel links to be combined for operation at four times the rate of an individual link; and configuring each of the ports at one end of the four parallel connected Fibre Channel links for operation at four times the rate of an individual link upon determining that the ports at one end of each of the four parallel connected Fibre Channel links are capable of operating as parallel lanes, that each of the ports at one end of each of the four parallel connected Fibre Channel links has indicated capability of operation at four times the rate of an individual link and that each of the four parallel connected Fibre Channel links has independently negotiated for operation at an equal speed which allows four parallel connected Fibre Channel links to be combined for operation at four times the rate of an individual link.

11. An apparatus comprising:

a Fibre Channel port for connection to a Fibre Channel links, the port including an optical transceiver capable of operating at three different speeds but having only one speed selection pin by performing link speed negotiation at only two of the three different speeds;

a processor coupled to said four Fibre Channel port;

memory coupled to said processor and storing processor-executable instructions for executing a method comprising the steps of:

performing link speed negotiation by performing link speed negotiation at only two of the three different speeds of said optical transceiver and selecting the third speed of the three different speeds of said optical transceiver by reviewing a bit setting in a Control Field in a Training Frame in a Transmitting Training Signal;

determining if the negotiated speed requires a change from the modulation type used during link speed negotiation;

proceeding directly to transmitter training when no change in modulation type is determined and performing transmitter training;

setting the changed modulation type in said optical transceiver when a change in modulation type is determined;

determining that said optical transceiver is ready to operate using the changed modulation type by monitoring a Ready bit in an addressable memory location of a memory in the optical transceiver, wherein the optical transceiver operates according to a small form factor (SFF) specification;

proceeding to changed modulation type transmitter training when it is determined that said optical transceiver is ready to operate using the changed modulation type; and performing changed modulation type transmitter training.

12. The apparatus of claim 11, wherein the two speeds used for link speed negotiation are the lowest speed and the middle speed and wherein the bit setting indicates the highest speed.

13. The apparatus of claim 12, wherein the three speeds are i6 Gigabits per second (Gbps), 32 Gbps and 64 Gbps.

14. The apparatus of claim 11, wherein performing changed modulation type transmitter training includes:

determining if said optical transceiver has achieved frame lock;

setting a receiver frame lock bit in a Status Field in the Training Frame in the Transmitting Training Signal when it is determined that said optical transceiver has achieved frame lock;

determining that far end receive frame lock has been achieved by monitoring received bits in the Status Field in the Training Frame in the Transmitting Training Signals; and commencing coefficient training when it is determined that said optical transceiver has achieved frame lock and that the far end frame lock has been achieved.

15. The apparatus of claim 11, further comprising:

three additional Fibre Channel ports for connection to Fibre Channel links which are parallel with the Fibre Channel link, each port including an optical transceiver capable of operating at three different speeds but having only one speed selection pin, said three additional ports coupled to said processor, wherein the method further comprises the steps of:
- independently performing the steps of claim ii for said three additional ports;
- determining, after speed negotiation and transmitter training, if the ports at one end of each of the four parallel connected Fibre Channel links are capable of operating as parallel lanes;
- determining, after speed negotiation and transmitter training, if each of the ports at one end of the four parallel connected Fibre Channel links has indicated capability of operation at four times the rate of an individual link;
- determining, after speed negotiation and transmitter training, if each of the four parallel connected Fibre Channel links has independently negotiated for operation at an equal speed which allows four parallel connected Fibre Channel links to be combined for operation at four times the rate of an individual link; and
- configuring each of the ports at one end of the four parallel connected Fibre Channel links for operation at four times the rate of an individual link upon determining that the ports at one end of each of the four parallel connected Fibre Channel links are capable of operating as parallel lanes, that each of the ports at one end of each of the four parallel connected Fibre Channel links has indicated capability of operation at four times the rate of an individual link and that each of the four parallel connected Fibre Channel links has independently negotiated for operation at an equal speed which allows four parallel connected Fibre Channel links to be combined for operation at four times the rate of an individual link.

* * * * *